Patented Jan. 18, 1949

2,459,525

UNITED STATES PATENT OFFICE 2,459,525

TRIPHENYLMETHYL BUTYL ETHER AS AN INSECTICIDE

Ingenuin Hechenbleikner, Stamford, Conn., assignor to American Cyanamid Company, New York, N. Y., a corporation of Maine No Drawing. Original application May 31, 1940, Serial No. 338,047. Divided and this application October 23, 1944, Serial No. 560,028. In Canada April 9, 1941

5 Claims. (Cl. 167—30)

The present invention relates to an insecticide and more particularly to a compound which is especially effective as a contact poison for the control of insect pests, and its method of use.

It has been discovered that triphenylmethyl butyl ether possesses powerful insecticidal and ovicidal activity particularly against sucking and soft-bodied insects and their eggs, and that such activity is attained without any substantial harmful or detrimental action on the vegetation infested with the insect.

The following example in which the parts are by weight illustrates a specific method of preparing the compound.

Example 10 parts of triphenylmethyl chloride were added to a solution consisting of 0.83 part of metallic sodium dissolved in 10 parts of butyl alcohol. The mixture was heated upon a steam bath for one hour, then poured into water and extracted with ether. The ether extract was washed with a large volume of water and dried over sodium sulfate. The triphenylmethyl butyl ether crystallized after evaporation of the ether. After recrystallization from ethyl alcohol the product had a melting point of 50° C.

Spray solutions were prepared by dissolving the triphenylmethyl butyl ether in a solvent medium consisting of 65% acetone and 35% water. A 100% control was obtained when a spray of 1–1000 dilution was used against the citrus red spider and its eggs. The insecticide also gave a 99.5% control on the citrus red spider with a spray of 1–2000 dilution.

Triphenylmethyl butyl ether, while especially effective for controlling the red spider and its eggs, may also be used for the control of aphids, white fly nymphs, garden fleahoppers and the like.

This new insecticide may be applied in any of the conventional manners. Thus, for example, it may be used as an aqueous solution, in an aqueous emulsion or it may also be incorporated in organic liquids such as the aliphatic and aromatic hydrocarbons for spraying purposes. It may be effectively used in dusts with solid diluents such as kieselguhr, wood flour, walnut shell and talc.

This application is a division of my copending application Serial No. 338,047, filed May 31, 1940, now Patent No. 2,411,428.

While the invention has been described with particular reference to specific embodiments, it is to be understood that it is not to be limited thereto but is to be construed broadly and restricted solely by the scope of the appended claims.

I claim:

1. A method of combating insect pests which includes exposing them to a toxic quantity of triphenylmethyl butyl ether.

2. An insecticidal composition including a toxic amount of triphenylmethyl butyl ether and a distender.

3. An insecticidal composition including a toxic amount of triphenylmethyl butyl ether incorporated in an aqueous emulsion.

4. An insecticidal composition including a toxic amount of triphenylmethyl butyl ether incorporated in an organic liquid solvent.

5. An insecticidal composition including a toxic amount of triphenylmethyl butyl ether incorporated in a solvent medium consisting of 65% acetone and 35% water.

INGENUIN HECHENBLEIKNER.

REFERENCES CITED

The following references are of record in the file of this patent:

UNITED STATES PATENTS

| Number | Name | Date |
|---|---|---|
| 2,281,624 | Schussler | May 5, 1942 |

FOREIGN PATENTS

| Number | Country | Date |
|---|---|---|
| 425,971 | Canada | Feb. 7, 1945 |